UNITED STATES PATENT OFFICE.

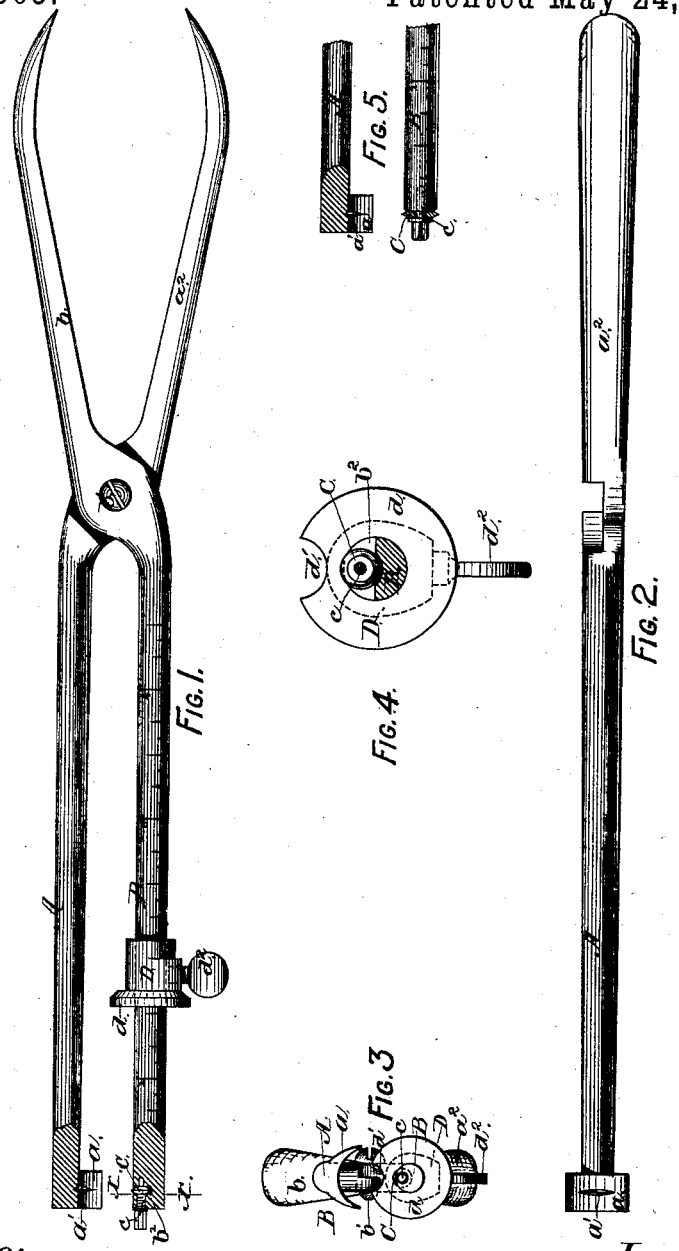

EMANUEL B. TOEDT AND EDWARD P. BURNHAM, OF ALBANY, NEW YORK.

INSTRUMENT FOR CUTTING OFF GLASS TUBES.

SPECIFICATION forming part of Letters Patent No. 363,563, dated May 24, 1887.

Application filed January 17, 1885. Serial No. 153,155. (No model.)

*To all whom it may concern:*

Be it known that we, EMANUEL B. TOEDT and EDWARD P. BURNHAM, both of the city and county of Albany, in the State of New York, have invented a new and useful Instrument for Cutting Off Glass Tubes, of which the following is a full and exact description, reference being had to the accompanying drawings, which form part of this specification, and in which—

Figure 1 is a side elevation of our instrument, the outer ends of the arms being shown in section; Fig. 2, an inverted plan view of the outer end of the upper arm; Fig. 3, an end elevation of the instrument; Fig. 4, an enlarged transverse section, at the line $x$ $x$ of Fig. 1, of the lower arm of the instrument; and Fig. 5, a side elevation of the outer ends of both arms of the instrument, showing a modification of our invention.

Our invention consists of an instrument made in a shape approximating a pair of shears, the lower arm of which is made in the form of a round bar of suitable diameter to slip freely into the bore of the tube to be cut. The said lower arm is provided at or near its outer end with a cutter adapted to incise the surface of the glass inside the bore of the tube, and it is also provided with a movable collar, which serves as a guide for the end of the tube during the operation of cutting. The upper arm of the instrument is of the same length as the lower one, and is provided with a segmental flange, which bears against the outer surface of the tube in the operation of cutting, the inner surface of said flange being provided with a depression, which closes over the cutter when the two arms are closed together, so as to form a shield for said cutter for the purpose of protecting it from injury.

As represented in the drawings, A is the upper arm, B the lower arm, C the cutter, and D the movable collar or gage.

The upper arm, A, is provided at the outer end with a segmental flange, $a$, whose concave surface is arranged to lap over the lower arm, B, and has a transverse depression, $a'$, cut therein to form a pocket for closing over the cutter C. The opposite end of the upper arm is fashioned to form the handle $a^2$ of the ordinary form for cutting-instruments.

The lower arm, B, is made in the form of a round bar of suitable size to slip freely into the bore of the glass tube to be cut. The said arm is provided with a handle, $b$, which is like the handle $a^2$ of the upper arm, the two handles $a^2$ and $b$ being arranged so as to be grasped in one hand of the operator, and the two arms A and B being jointed to work on the pivot $b'$, in the manner of a pair of shears or tongs.

The cutter C is preferably made in the form of a disk of hardened steel, provided with a knife-edge around its perimeter and fitted to revolve freely on a center-pin, $c$. The said cutter can be arranged eccentrically to the arm B, as shown in Figs. 1, 3, and 4, or concentrically to the said arm, as shown in Fig. 5. When arranged eccentrically to the arm B, the said cutter is fitted into a transverse cut, $b^2$, in the upper side of said arm, and near the outer end thereof, and said cutter is so arranged that the upper part of its cutting-edge will project slightly above the upper surface of said arm. The center-pin $c$ is screwed into the end of the arm, and its inner end, reduced in diameter, extends through the center hole of the cutter and enters the body of the arm B, so as to form a stable bearing for said cutter to revolve on. When arranged concentrically to the arm B, the cutter C is made slightly larger than the diameter of the arm, and is attached, as shown in Fig. 5, to the outer end of said arm by the center-pin $c$, which is screwed into the end of the arm, and forms a stud on which the said cutter can revolve quite freely. By means of the screw center-pin $c$ the cutter C can be readily removed so as to substitute a new cutter whenever occasion requires. When preferred, a diamond or other glass-cutting substance can be inserted in the upper surface of the arm B, to serve as a permanent cutter, as a substitute for the revolving cutter C.

The collar D is bored to slide freely on the lower arm, B, and is preferably made with a projecting flange, $d$, of greater diameter than the bore of the tube on which the instrument is to be used. Said flange is provided with a notch, $d'$, in the upper side, so as to permit the upper arm, A, to approach the lower arm, B, sufficiently close to obtain for the segmental flange $a$ the required pressure against the outer surface of a tube to be cut. The set-screw $d^2$ is inserted in the collar D for the purpose of securing said collar at any required point on the arm B; and for the purpose of facilitating the setting of said collar, the arm B is marked with graduations of the inch and fractions thereof, to show at a glance the distance between the cutting-edge of the cutter C and the face of the collar D.

The operation of this instrument is as follows: The collar D being adjusted at the required distance from the cutter C, and the instrument being held by the operator in one hand, the tube to be cut is slipped over the arm B until the end of said tube is in contact with the face of the collar D. Then, by pressing together the handles $a^2$ and $b$, the segmental flange $a$ is made to bear with gentle force against the outer surface of the tube, directly above the cutter C. The operator, with his free hand, while keeping the end of the tube against the collar D, revolves the tube between the cutter and segmental flange, thereby producing an incision in the surface of the bore of the tube, which, if it does not at once cause a severing of the tube, will indent it sufficiently to produce a separation at the marked line on the application of a slight jar or strain.

We claim as our invention—

In an instrument for cutting off glass tubes, the combination of the arm A, provided with a segmental flange, $a$, having a transverse depression, $a'$, in its under face, with the arm B, rotary cutter C, and the removable center-pin $c$, screwed in said arm B, on which said cutter turns, the said flange $a$ closing over said cutter C and allowing the same to enter its depression $a'$ when the two arms are closed together, thus serving as a shield to said cutter, substantially as set forth.

EMANUEL B. TOEDT.
    EDWARD P. BURNHAM.

Witnesses:
 WM. H. LOW,
 S. B. BREWER.